April 27, 1954        E. E. SCHNELL        2,676,555
SEEDING MECHANISM GEARING CONTROLLED BY POWER LIFT CLUTCH
Filed April 21, 1950        2 Sheets-Sheet 1
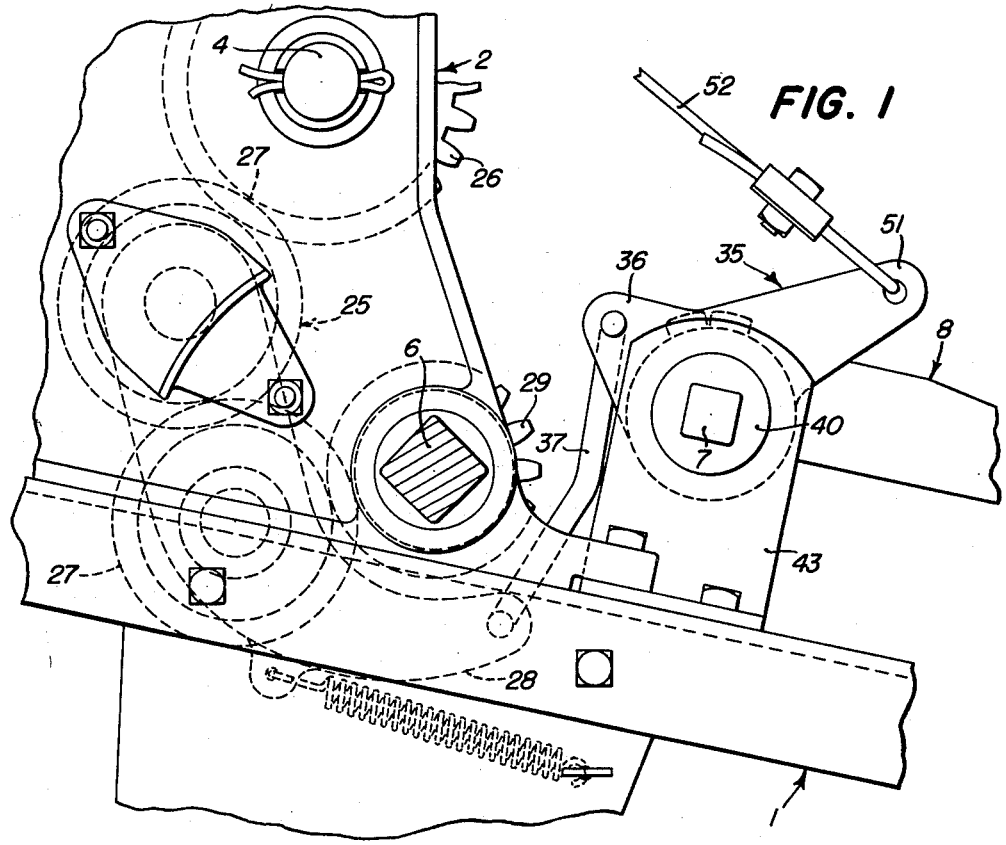
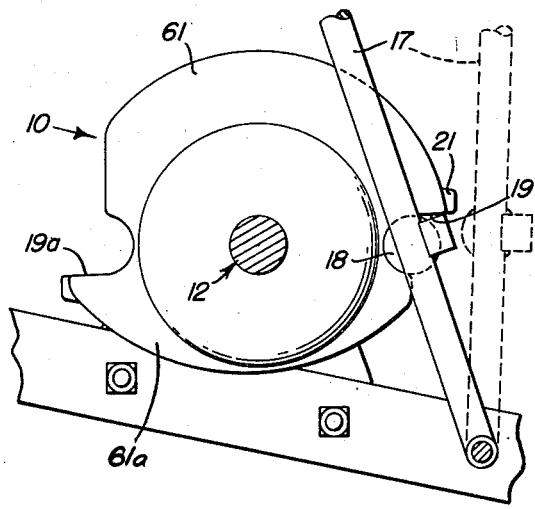
INVENTOR.
ERNST E. SCHNELL
BY
ATTORNEYS April 27, 1954     E. E. SCHNELL     2,676,555
SEEDING MECHANISM GEARING CONTROLLED BY POWER LIFT CLUTCH
Filed April 21, 1950     2 Sheets-Sheet 2
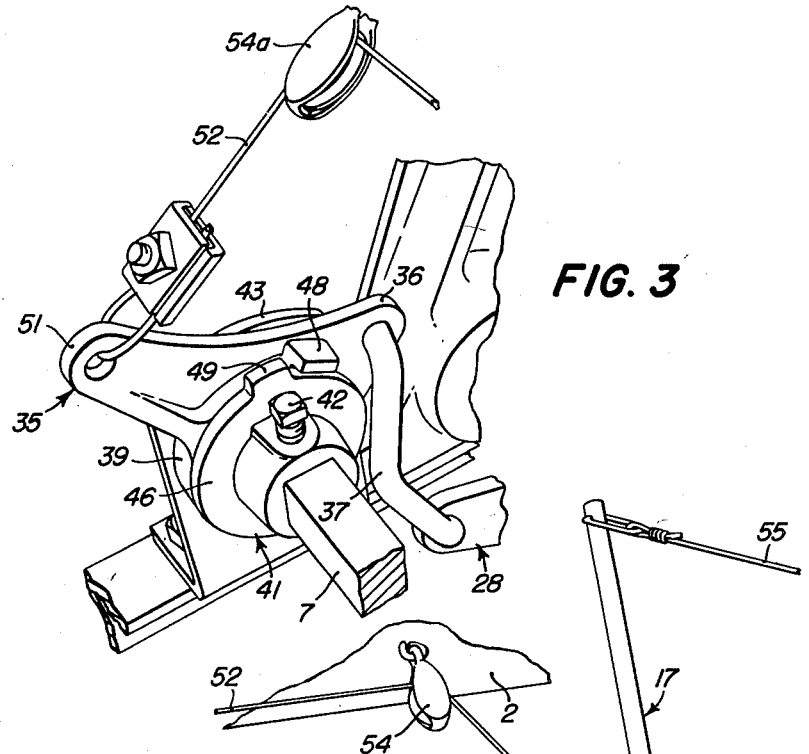
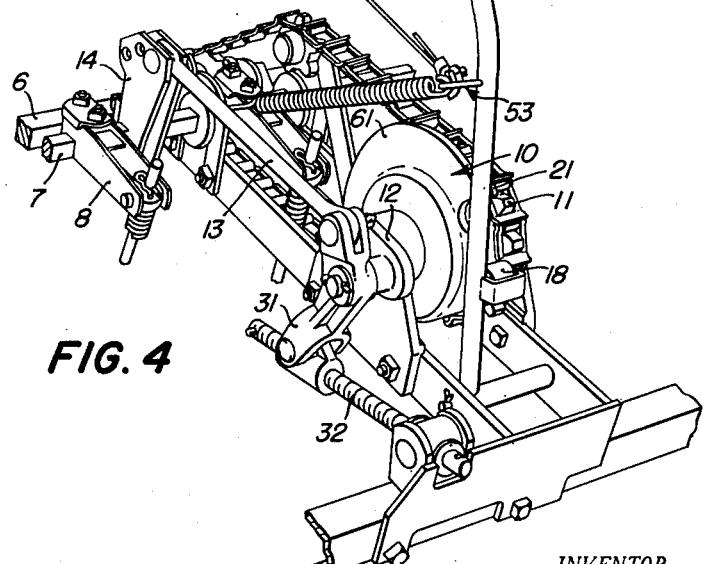
INVENTOR.
ERNST E. SCHNELL Patented Apr. 27, 1954

2,676,555

UNITED STATES PATENT OFFICE 2,676,555

SEEDING MECHANISM GEARING CONTROLLED BY POWER LIFT CLUTCH

Ernst E. Schnell, West Bend, Wis., assignor to John Deere Van Brunt Company, Horicon, Wis., a corporation of Wisconsin Application April 21, 1950, Serial No. 157,322

4 Claims. (Cl. 111—67)

The present invention relates generally to agricultural implements and more particularly to grain drills and other machines having furrow openers or other ground-engaging means and seeding mechanism or other units operating in conjunction therewith.

The object and general nature of the present invention is the provision of means for securing an interruption of the seeding drive at the beginning of the furrow opener raising cycle, rather than leaving the seeding mechanism in full operation until the furrow openers are moved substantially out of the ground. More specifically, it is an important feature of this invention to provide simplified and inexpensive means for throwing the seeding drive out of gear substantially while the furrow openers are at their full depth of operation just before or substantially concomitantly with the initiation of the raising of the furrow openers, and it is a still further object of this invention to provide an early-operated seeding drive disconnect means which may easily and readily be arranged for attachment to existing implements having conventional drive-disconnect mechanism.

These and other objects and advantages of the present invention will be apparent to those skilled in the art after a consideration of the following detailed description, taken in conjunction with the accompanying drawings, in which:

Figure 1 is a fragmentary end view of a grain drill in which the principles of the present invention have been incorporated.

Figure 2 is a side view of the self-interrupting lift clutch carried by the grain drill.

Figure 3 is a perspective view showing the bell crank which actuates the gear throw-out for the seeding mechanism.

Figure 4 is a perspective view showing the self-interrupting clutch unit of the grain drill and its actuating and driving means.

Referring now to the drawings, the grain drill in which the principles of the present invention have been shown by way of illustration incorporates a main frame 1 which supports a seed box 2 having conventional seeding mechanism which is driven by a seed shaft 4. The grain drill frame 1 is supported on ground wheels carried by any suitable means, such as drop axles, and the ground wheels are connected by conventional chain and sprocket means to drive the jackshaft 6. The frame 1 also carries a rockshaft 7 having arms 8 fixed thereto and which are connected by the usual spring pressure rod means to associated furrow opening means. The grain drill frame 1 also carries a power lift self-interrupting clutch unit 10 which, so far as the present invention is concerned, may be similar to that shown in U. S. Patent 2,432,897, issued December 16, 1947, to W. A. Hyland et al.

The present invention is not concerned with the particular details per se of the clutch unit 10, and it will therefore suffice to note that the unit 10 includes a driving member 11 driven by a suitable connection, such as sprocket and chain means, from the jackshaft 6, and a driven member 12, preferably in the form of a crank, which is connected by a link 13 to an arm 14 on the rockshaft 7. The driven member 12 is optionally connectible to the driving member 11 by self-interrupting mechanism, which may be substantially like that shown in U. S. Patent 2,029,127, issued January 28, 1936, to John Schaeffer, the connection of the driven clutch member to the driving clutch member being under the control of a trip lever 17 which is pivotally mounted on the frame 1 and carries a roller 18 which, when the clutch unit 10 is disconnected, lies in a notch 19 formed in the rim of the driven clutch member 12, the roller 18 being arranged to act against a part 21 for holding the clutch parts in disengaged relation.

The seeding shaft 4 is adapted to be optionally driven from the jackshaft 6 by means of disconnect gearing indicated in its entirety by the reference numeral 25. The gearing 25 includes a feed shaft gear 26, and a pair of meshing gears 27 carried on an oscillatable gear hanger, one of the gears 27 being adapted to be shifted into and out of engagement with a gear 29 fixed to the jackshaft 6. Thus, swinging the gear hanger 28 from one position to another serves to carry the lower gear 27 into and out of drive-transmitting relation with the gear 29 on the jackshaft 6.

The structure so far described is largely conventional, and it is also conventional in the grain drill art to provide some kind of throw-out connection between the pressure shaft, to which the pressure arms connected with the furrow openers are fixed, and the seeding drive disconnect means so that the seeding is interrupted whenever the furrow openers are raised into their transport position out of contact with the ground. It is also conventional in this art to provide some means for adjusting the position of the pressure shaft and the pressure arms when the furrow openers are in the ground, not only for the purposes of disposing the furrow openers at different operating depths but also for the purpose of imposing more or less downward pressure against the furrow openers to hold them to their work, as when operating under hard soil conditions. To this end, for example, the link 13 shown in the accompanying drawings may be connected with the driven clutch member 12 through a rocking arm 31 one end of which is connected by an adjustable crank screw anchoring means 32, the adjusting of which serves to dispose the rockshaft or pressure shaft 7 in different positions of adjustment when the clutch unit 10 is operated to lower the furrow openers into their working position. The U. S. patent to Hyland et al., 2,308,081, issued January 12, 1943, shows one type of connection between the grain drill rockshaft and the gear hanger by which the seeding drive is thrown out of gear whenever the pressure shaft is rocked to raise the furrow openers. However, in constructions of the type just described, the seeding drive is not always interrupted as early in the furrow-opener-lifting cycle as is sometimes desired, and according to the principles of the present invention I provide means whereby the gear hanger may be moved to interrupt the seeding drive substantially at or even before the clutch unit 10 starts to raise the furrow openers out of their working position.

To the end of securing an early disconnecting of the seeding drive, according to the principles of the present invention, I provide arm means in the form of a bell crank 35, one arm 36 of which is apertured to pivotally receive one end of a link 37, the other end of which is pivotally connected to the outer end of the gear hanger 28. The bell crank member 35 is provided with an enlarged hub section 39 by which the member 35 is rockably mounted on a combined arm and bearing member 41 which is fixed to the outer end of the rockshaft 7 by any suitable means, such as a set screw 42 or the like. The outer end 40 of the member 41 is received in an opening in a bearing bracket 43 that is fixed as by bolts or the like to the adjacent frame member, with the hub portion 39 of the member 35 rockably mounted on the member 41 between the upper end of the bearing bracket 43 and a radially outwardly extending flange 46 on the bearing member 41. Abutment means in the form of a pair of cooperating lugs 48 and 49 are formed on or carried by the members 35 and 41, forming a one-way connection whereby when the rockshaft 7 is rocked in one direction the lugs 48 and 49 come into engagement and further rocking movement of the shaft 7 acts through the link 37 to swing the gear hanger 28 in a direction to carry the lower gear 27 out of engagement with the gear 29 on the jackshaft 6, thereby throwing the seeding drive out of gear and interrupting the transmission of rotary motion to the seeding shaft 4. Ordinarily there must be sufficient space between the lugs 48 and 49 to accommodate disposing the rockshaft 7 in different positions to govern the operating depth of the furrow openers and/or the spring pressure applied thereto, and as a result the gears 27 and 29 are not ordinarily disengaged until the furrow openers are raised out of the ground. To provide for an early disconnecting of the seeding drive, I provide a second arm 51 on the member or bell crank 35, and this arm is connected through a cable 52 to a connection 53 with the trip lever 17 of the clutch unit 10. The cable 52, which forms a motion-transmitting means between the trip lever 17 and the bell crank 35, may be arranged in any suitable way, as by being trained over one or more sheave units 54 and 54a carried by the seed box 2. Thus, when the trip lever 17 is pulled forwardly, as by a trip lever cable 55, a pull is exerted through the cable 52 to cause the bell crank 35 to be rocked relative to the bearing member 41 in a direction to move the gear hanger 28 away from the gear 29, thus disconnecting the seed gear 27 therefrom. During this movement of the bell crank 35 relative to the bearing member 41, the lug 48 moves away from the lug 49. Thus, the seeding drive is interrupted at the start of the lifting cycle, even before the clutch unit 10 has started to actuate the rockshaft 7 and lift the furrow openers out of their operating position. The arm 51 may be considered as a member that is movably mounted on the grain drill and is connected, as through the lugs 48 and 49, with the means that disconnects the gear 27 from the gear 29 when the furrow openers are raised.

In order to make it unnecessary for the operator to retain his hold on the cable 55 and to retain the trip lever 17 in a forward position, holding the gear hanger 28 away from the gear 29, until the shaft 7 has been rocked through the angle necessary to cause the lug 49 to engage the lug 48 and hold the bell crank 35 in a position to retain the gears 27 and 29 disengaged, I provide an enlarged and arcuately extended flange 61 (Figures 2 and 4) on the driven member 12 of the clutch unit 10. The flange 61 is of such radial dimension that as soon as the roller 18 on the trip lever 17 moves out of the notch 19 and the clutch member 12 moved a few degrees, the radially outwardly extended portion of the flange 61 comes underneath the roller 18 and holds the trip lever 17 in a forward position, whereby the operator may then relax his hold on the cable 55. The flange 61 is extended circumferentially substantially to the opposite notch 19a, but at or before the time this portion of the flange 61 has been brought under the roller 18, the rockshaft 7 will have been moved through a sufficient extent to bring the lug 49 up against the lug 48, whereby the abutments 48 and 49 now hold the gear hanger 28 in a position disconnecting the seeding drive, and the seeding drive will thus be held in disengaged or disconnected relation so long as the furrow openers are held in their raised position.

When it is desired to lower the furrow openers the operator exerts a second pull on the cable 55, thus again swinging the trip lever 17 forwardly, which moves the roller 18 out of the second notch and permits the mechanism of the power lift clutch 10 to engage. The rotation of the clutch unit 10 then moves the link 13 forwardly which permits the furrow openers to drop to the ground, the rockshaft or pressure shaft 7 moving in a direction opposite to that in which it moved when the furrow openers were raised. Since the opposite flange portion 61a on the clutch unit 10 has not been extended radially beyond conventional construction, this permits the seeding drive to immediately reengage so that there will be no delay in beginning the seeding even before the openers have reached their full operating depth or substantially so.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement having seeding mechanism and furrow openers, means for driving said seeding mechanism, said means including disconnectible parts which are disconnected to stop said driving means, furrow opener raising and lowering means, a power lift clutch having a manually actuatable trip lever for actuating the clutch, means actuated by said clutch for operating said raising and lowering means, and means operatively connected with said furrow opener raising and lowering means and with said parts for disconnecting said parts with raising of the furrow openers and for maintaining said parts disconnected when said furrow openers are in raised position, said parts being capable of disconnection with the furrow openers in lowered working position, the combination therewith of a connection between said trip lever and a portion of said means operatively connected to said furrow opener raising and lowering means for disconnecting said parts when the trip lever is moved to a position actuating the clutch, said last-mentioned disconnecting of said parts occurring before said clutch starts operation of said furrow opener raising and lowering means to raise said furrow openers, and means operatively connected with said clutch and actuated thereby to maintain said trip lever in its parts-disconnecting position until the furrow opener raising and lowering means are operated to raise the furrow openers and maintain the parts disconnected.

2. In an agricultural implement having seeding mechanism and furrow openers, means including relatively movable parts adapted to be connected for driving said seeding mechanism and adapted to be disconnected to stop said driving means, furrow opener raising and lowering means including a rockshaft, a power lift clutch having a manually actuatable trip lever for actuating the clutch, means actuated by said clutch for rocking said rockshaft, and means on said rockshaft operatively connected with one of said parts for holding said one part disconnected from the other part when said rockshaft is rocked to raise said furrow openers, a portion of said last-mentioned means being capable of movement to disconnect said parts with the furrow openers in lowered working position, the combination therewith of an arm on said portion, and a connection between said trip lever and said arm for disconnecting said parts by movement of said trip lever to clutch-actuating position substantially before said clutch starts actuation of the means for rocking said rockshaft to raise the furrow openers.

3. In an agricultural implement as set forth in claim 2, the combination therein further characterized by means carried by the power lift clutch and engageable with said trip lever for maintaining the latter in its parts-disconnecting position until the furrow openers have been raised.

4. In an agricultural implement having seeding mechanism and furrow openers, means for driving said seeding mechanism, said means including disconnectible parts which are disconnected to stop said driving means, furrow opener raising and lowering means, a power lift clutch having a manually actuatable trip lever for actuating the clutch, means actuated by said clutch for operating said raising and lowering means, and means operatively connected with said furrow opener raising and lowering means and with said parts for disconnecting said parts with raising of the furrow openers and for maintaining said parts disconnected when said furrow openers are in raised position, said parts being capable of disconnection with the furrow openers in lowered working position, the combination therewith of a member movably mounted on the implement, and a connection between said movable member and a portion of said means operatively connected to said furrow opener raising and lowering means for disconnecting said parts when said member is moved in one direction, and a connection between said movable member and the trip lever whereby when the latter is moved to a position actuating the clutch said movable member is moved in said one direction, said last-mentioned disconnecting of said parts occurring before said clutch starts operation of said furrow opener raising and lowering means to raise said furrow openers, and means operatively connected with said clutch and actuated thereby to maintain said trip lever in its parts-disconnecting position until the furrow opener raising and lowering means are operated to raise the furrow openers and maintain the parts disconnected.

References Cited in the file of this patent

UNITED STATES PATENTS

| Number | Name | Date |
|---|---|---|
| 7,268 | Peirson | Apr. 9, 1850 |
| 304,830 | Koble | Sept. 9, 1884 |
| 1,842,059 | Alegria | Jan. 19, 1932 |
| 1,968,187 | White | July 31, 1934 |
| 2,031,650 | Hendricks et al. | Feb. 25, 1936 |
| 2,223,624 | Krause | Dec. 3, 1940 |
| 2,308,081 | Hyland et al. | Jan. 12, 1943 |
| 2,396,980 | Blue | Mar. 19, 1946 |